(12) United States Patent
Youn

(10) Patent No.: US 6,219,691 B1
(45) Date of Patent: *Apr. 17, 2001

(54) COMMUNICATION CIRCULATION SYSTEM AND METHOD FOR COMMUNICATION IN A NETWORK

(75) Inventor: Sunny M. Youn, West Orange, NJ (US)

(73) Assignee: AT&T Corporation, New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/974,537

(22) Filed: Nov. 19, 1997

(51) Int. Cl.[7] .................................................. G06F 13/00
(52) U.S. Cl. .......................... 709/200; 709/205; 709/206
(58) Field of Search ................................. 709/200, 251, 709/252, 238, 204, 206, 205; 370/256, 260, 408

(56) References Cited

U.S. PATENT DOCUMENTS

| | | | |
|---|---|---|---|
| 5,287,356 | * | 2/1994 | Parkhideh ............................. 370/445 |
| 5,390,242 | * | 2/1995 | Bales et al. ........................... 370/351 |
| 5,541,927 | * | 7/1996 | Kristol et al. ........................ 370/408 |
| 5,561,702 | * | 10/1996 | Lipp et al. ........................... 455/31.2 |
| 5,619,648 | * | 4/1997 | Canale et al. ........................ 709/206 |
| 5,757,781 | * | 5/1998 | Gilman et al. ....................... 370/260 |
| 5,862,329 | * | 1/1999 | Aras et al. ........................... 709/204 |
| 5,867,653 | * | 2/1999 | Aras et al. ........................... 709/204 |

OTHER PUBLICATIONS

Comer, "Internetworking With TCP/IP vol. 1: Principles, Protocols, and Architecture", pp. 92 and 99, 1995.*
Comer, "Internetworking With TCP/IP vol. 1: Principles, Protocols, and Architecture", pp. 92 and 99, 1995.*

* cited by examiner

Primary Examiner—Zarni Maung
Assistant Examiner—Philip B. Tran
(74) Attorney, Agent, or Firm—Oliff & Berridge, PLC

(57) ABSTRACT

A communication circulation system in a network that includes a communication circulation device coupled to a plurality of terminals. The communication circulation device receives a content message from one of the terminals and circulates the content message in a content space established by the communication circulation device. The content message has a tag that corresponds to an area of interest. When another content message is encountered that has a tag that matches the tag of the content message, subscribers of both content messages are informed so that communication between the subscribers may be established.

22 Claims, 15 Drawing Sheets

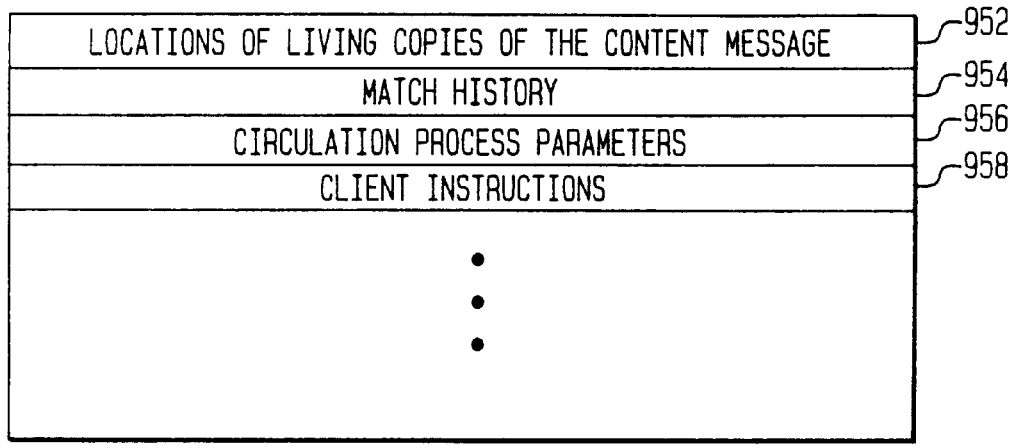
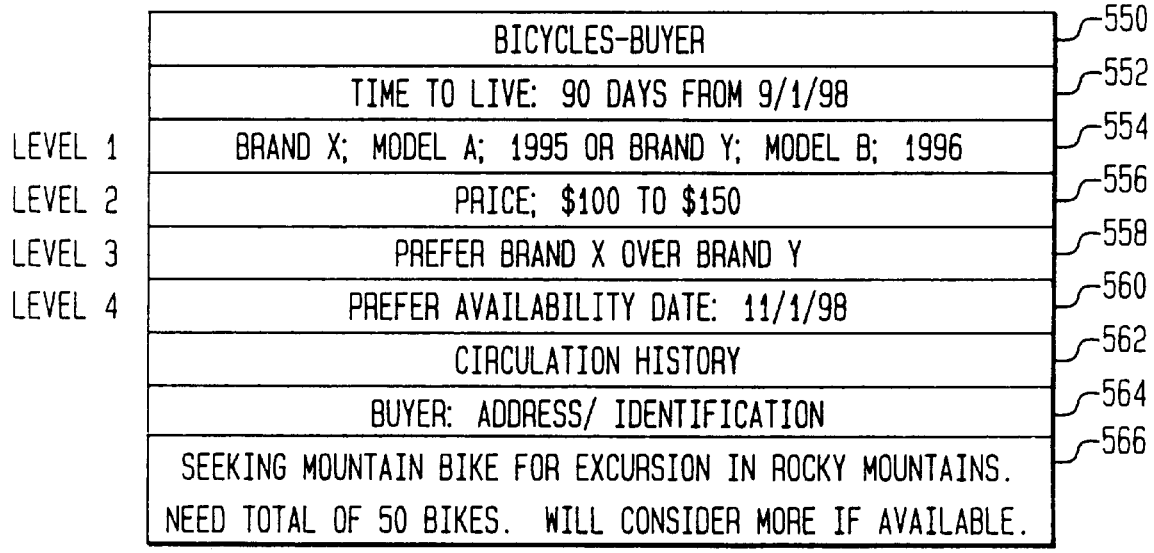

COMMUNICATION CIRCULATION SYSTEM AND METHOD FOR COMMUNICATION IN A NETWORK

This Application is related to U.S. Patent Application entitled "A Network Marketplace Device And Method" (application Ser. No. 08/974,538) filed on even date herewith under common assignees.

BACKGROUND OF THE INVENTION

1. Field of Invention

The present invention relates to network communications.

2. Description of Related Art

Networks provide communications using directional destination-specific addresses such as e-mail, for example. A party sends a message to a particular destination in the network and the message is routed through the network to the specified destination address. Additional flexibility is provided by multicast and broadcast capabilities where a message may be destined to multiple addresses or simply made available to be received at any address. On the Internet, bulletin boards act much like broadcasting in that messages are destined to the bulletin board address and become information that is made available to any party who accesses the bulletin board. However, available network communication technology such as described above do not provide support for a party to send a message without a destination address but hopes to find another party or a message of another party who shares a common area of interest. Thus, new technology is needed to provide such a communication scheme.

SUMMARY OF THE INVENTION

The invention provides a communication circulation system that receives a first party message that is addressed or "destined" to an area of interest (of the first party). The communication circulation system circulates the message until either the message is deleted (dies) or until a second party message or a second party who also has a similar area of interest as the first party is identified. When such a message or party is identified, communication between the first and the second parties may be established.

The communication circulation system includes a communication circulation device that receives messages from parties (subscribers) and circulates the messages throughout a network. Each message is tagged with a code that identifies the area of interest or content of the message and the message is circulated based on the tag.

Control units of the communication circulation device such as servers or routers of the network maintain a database regarding messages that have passed through each respective control unit and also receive information from other control units that assist in redirecting a message to other parts of the network. When two messages are identified to have corresponding tags, the subscribers associated with the messages are notified of this "match" and communication between the subscribers may be established.

The communication circulation system may be used to facilitate communication between trading parties, for example, so that an electronic marketplace is created where buyers and sellers conduct business via messages. The messages in the electronic marketplace may be handled by electronic agents that perform negotiations within the communication circulation system.

BRIEF DESCRIPTION OF THE DRAWINGS

The invention is described with reference to the following drawings wherein like numerals represent like elements, and wherein:

FIG. 16 is a diagram of a message entry;

FIG. 17 is a specific example of the content message;

DETAILED DESCRIPTION OF PREFERRED EMBODIMENTS

Figure 1:
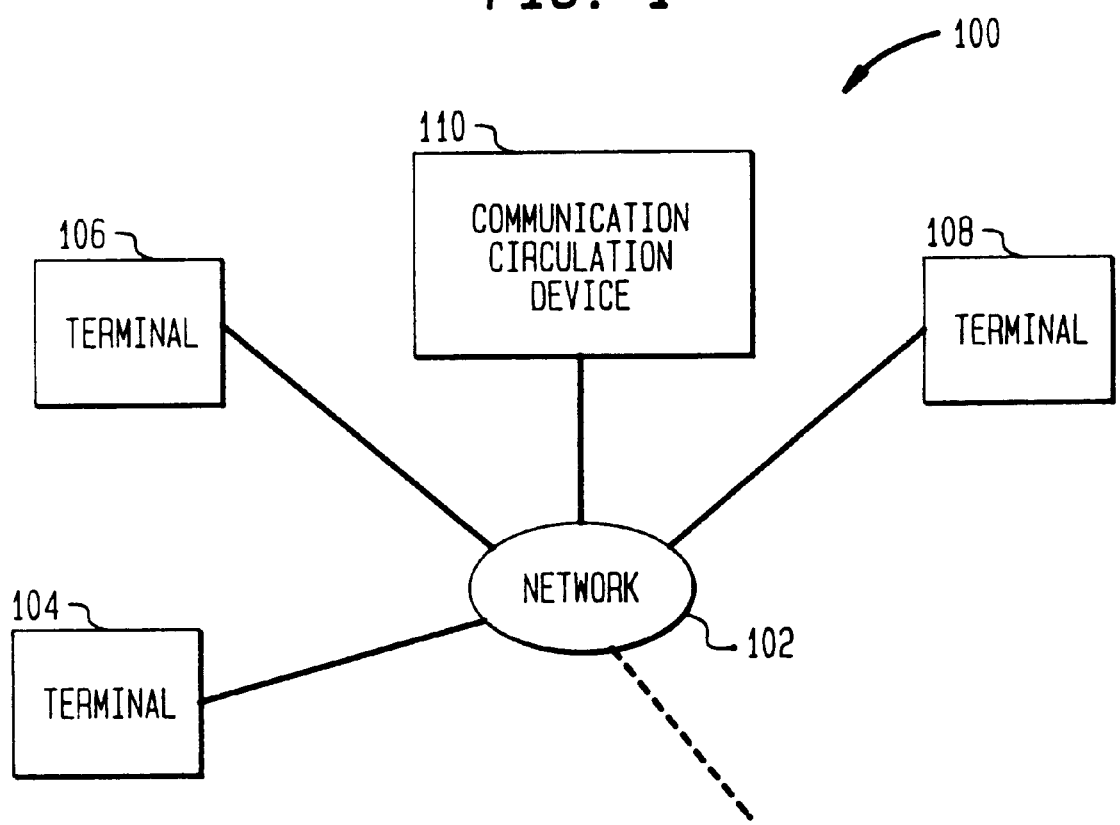
FIG. 1 is an exemplary diagram of a communication circulation system.

FIG. 1 shows a communication circulation system 100 that includes a communication circulation device 110, a network 102 and communication devices such as terminals 104, 106, and 108. The network 102 may be a telephone switching network or a digital network, for example, and the terminals 104, 106, and 108 can be any communication devices that transmit or receive information in the network 102, such as a computer or a telephone station.

The communication circulation device 110 provides a place or "space" to which subscribers may transmit messages. The communication circulation device 110 circulates the messages within the communication circulation device 110 until either communication is established among subscribers (parties who have access to the communication circulation device 110) or the messages die.

The communication circulation device 110 may be implemented in at least three ways: 1) a centralized unit that receives messages from the terminals 104, 106, and 108 through the network 102 and matches the messages with other messages directed to common area of interests; 2) a distributed unit where portions of the communication circulation device 110 (e.g., Application Specific Integrated Circuits, ASICs are distributed throughout the network 102 by associating respective portions with servers and routers of the network 102; and 3) the functions of the communication circulation device 110 are performed by the servers and the routers of the network 102. In the following discussion, the third implementation is assumed, and the servers and the routers of the network 102 act as control units and perform all the functions of the communication circulation device 110.

In the preferred embodiment, instead of sending a message to another terminal 106 or 108, the terminal 104 such as a personal computer sends a message to a subject of interest such as "Ground Beef" or "Bicycles", for example. That is, the terminal 102 sends the message having a "content destination" of "Ground Beef" rather than an address destination such as an address for terminal 106 or 108. The communication circulation device 110 receives the "Ground Beef" message and circulates the "Ground Beef" message in the network 102 so that as messages from other terminals 104 and 106 are also circulated, the "Ground Beef" message may "meet" another "Ground Beef" message launched by another terminal 104 or 106. When such a meeting or "match" is encountered, subscribers of both "Ground Beef" messages are informed, and communication between the two subscribers may be established.

The messages which are launched by the terminals 104, 106 and 108, are tagged with a code that identifies the area of interest or content of the messages. The messages are circulated in the communication circulation device 110 based on the tag. When a server or router of the network 102 receives a message, the tag of the message is scanned and the message is processed based on the tag.

Figure 2:
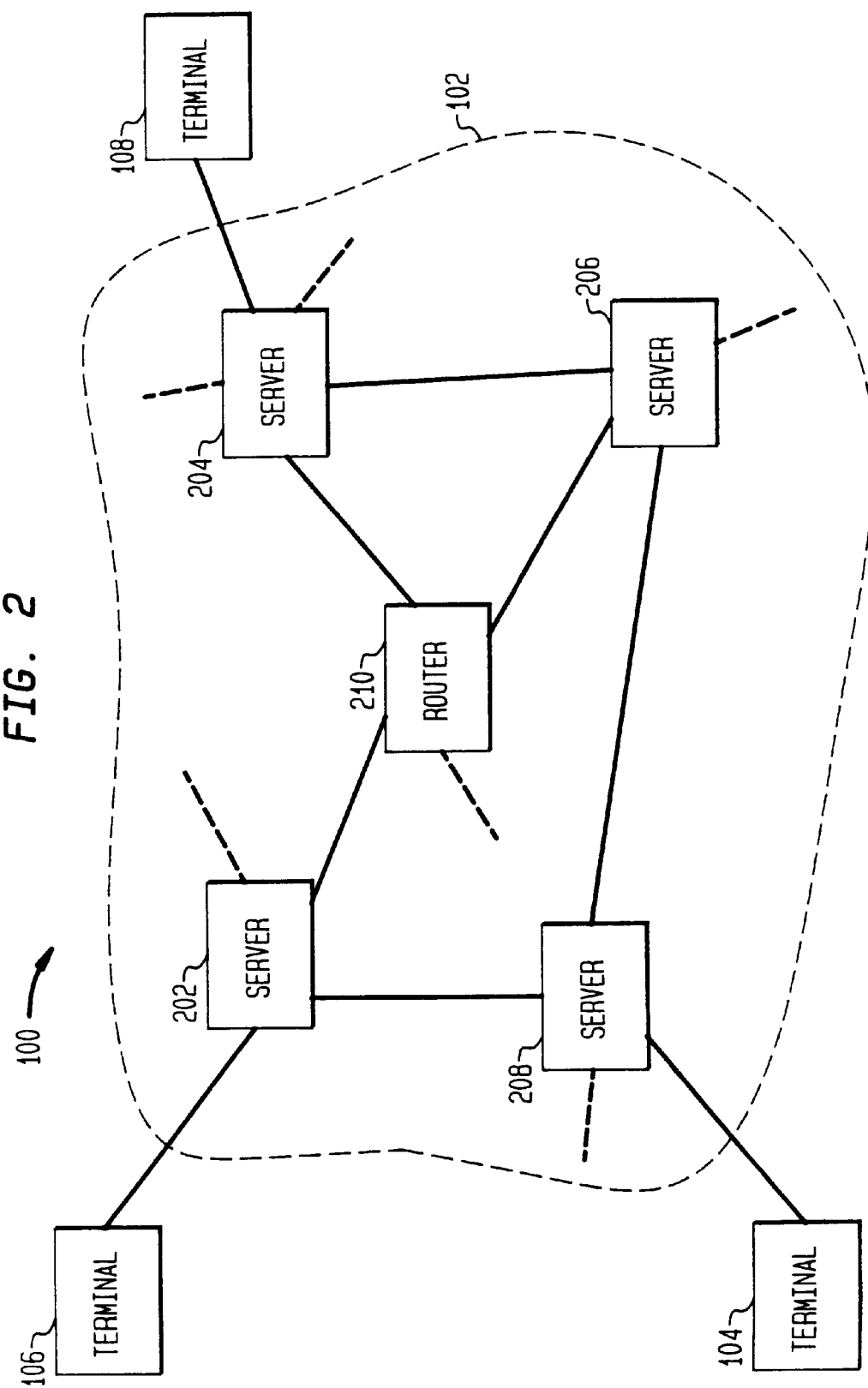
FIG. 2 is an example diagram of servers and routers interconnected in a network.

FIG. 2 shows an example of the communication circulation system 100 where the network 102 includes servers 202, 204, 206 and 208 and a router 210 which are also referred to as control units 202–210 of the communication circulation device 110. When the terminal 104 sends a message to the terminal 108 specifying the terminal 108 as a destination address, the message 108 is received and routed by the server 208 to the terminal 108. This type of message is referred to as a "destination" message because the message is explicitly directed to a particular destination address such as a telephone number. All the possible destinations to which a destination message may be directed is called a "destination space".

The network 102 may route the destination message from terminal 104 to the terminal 108 via several paths. For example, the destination message from the terminal 104 could be routed from the server 208 to: server 202→router 210→server 206→server 204→terminal 108. Alternatively, the message can proceed from server 208 to: server 206→server 204→terminal 108. Other paths are also possible, as evident from FIG. 2. Thus, while the destination is specified by a destination message, the path through which a destination message is routed is determined by the network 102 based on network congestion, cost, network failure, etc. From the terminals' 102–108 perspective, the servers 202–208 and routers 210 of the network 102 act as a unit to provide paths for destination messages. Thus, the network 102 may be illustrated as a box shown in FIG. 3.

Figure 3:
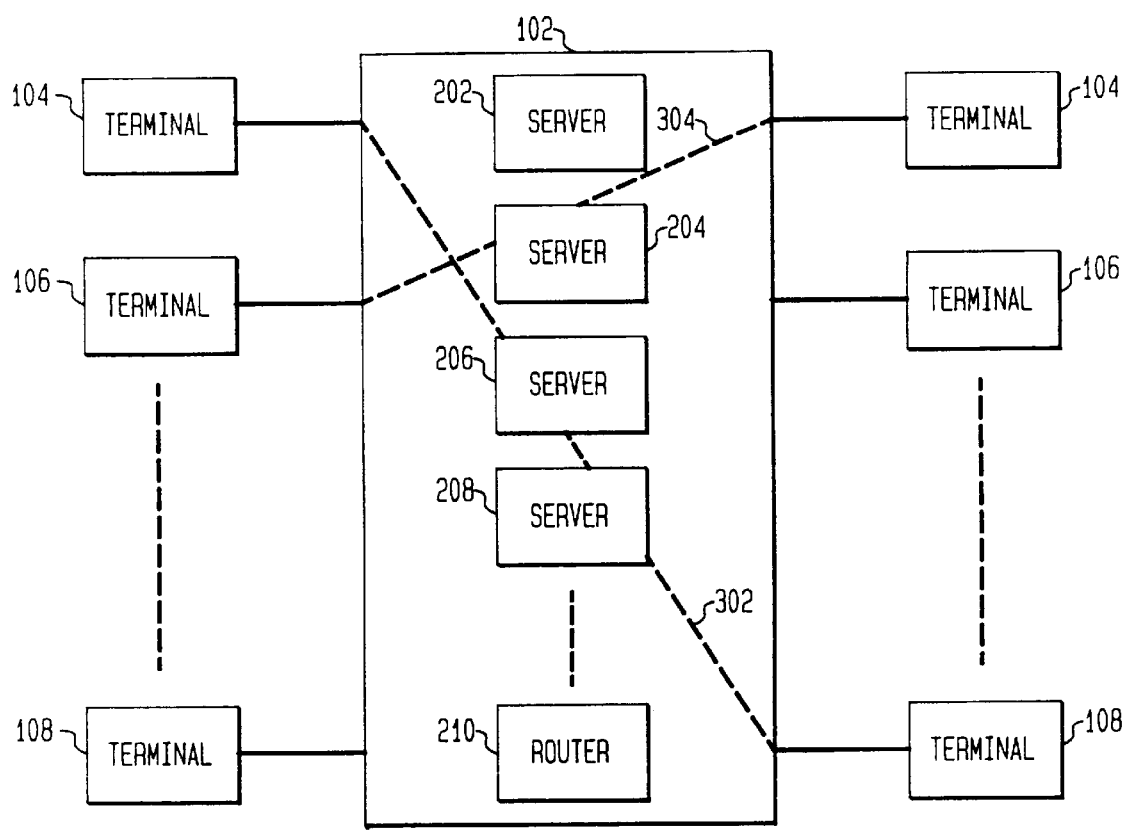
FIG. 3 is a conceptual diagram of paths formed by the network.

FIG. 3 shows the network 102 as a collection of servers 202–208 and router 210 or control units 202–210. The terminals 104–108 output destination messages into the network 102 and receive messages from the network 102 as shown on the left and right sides of FIG. 3, respectively. When the terminal 104 sends a message to the terminal 108, the control units 202–210 of the network 102 route the message from the terminal 104 to the terminal 108 and select a path such as path 302. When the terminal 106 sends a message to the terminal 104, the control units 202–210 select a different path such as path 304 for that message. Thus, the network 102 may be characterized as establishing the destination space to which destination messages may be launched and from which destination messages may be received.

Figure 4:
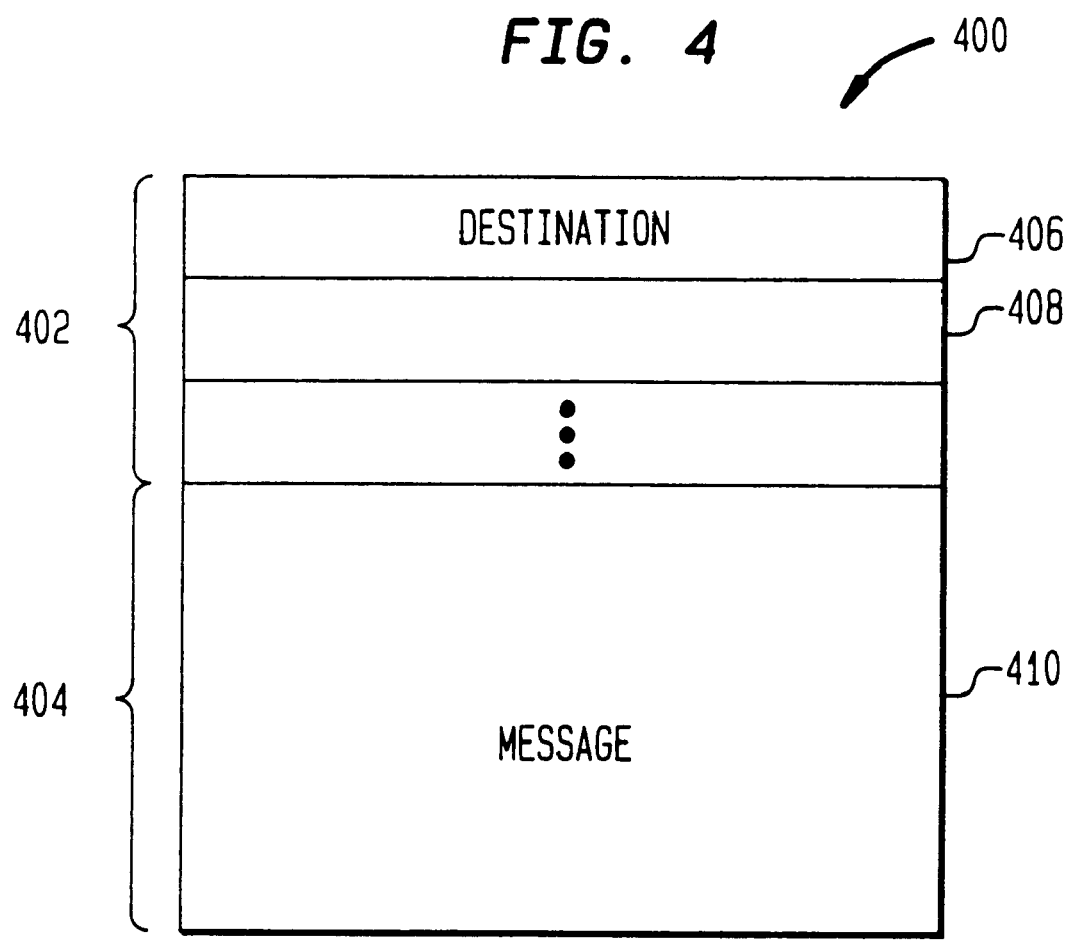
FIG. 4 shows an example of a destination message.

FIG. 4 shows an example of a destination message 400 having a header section 402 and a message section 404. The header section 402 contains fields such as fields 406, 408 and 410, for example. The field 406 contains a destination address and the fields 408–410 may contain other information such as routing preferences, message length, verification codes such as a cyclical redundancy code (CRC), for example.

When a message such as the message 400 is received, a control unit 202–210 examines the field 406 to determine the destination address and also examines the other fields 408–410 to determine information such as routing preferences. Based on the information from the header section 402, the control unit 202–210 selects a routing path and may write into an appropriate field 408–410 of the header section 402 information related to routing, for example. Other tasks may also be performed by the control unit 202–210 such as billing processing that may result in information written into the fields 408–410.

Figure 5:
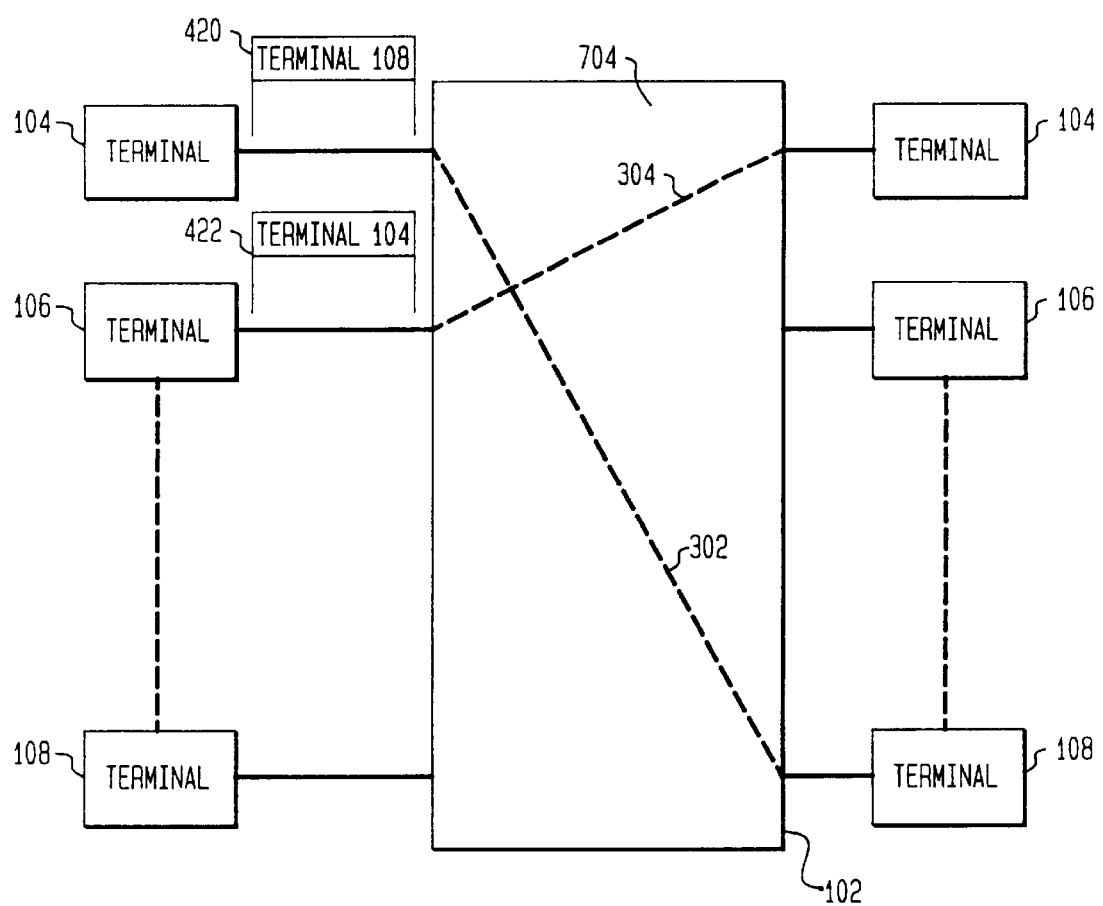
FIG. 5 shows a conceptual diagram of a destination space.

FIG. 5 shows the terminals 104 and 106 (source terminals) launching destination messages 420 and 422 to the terminals 108 and 104, respectively. The destination messages 420 and 422 are labeled by their destinations, i.e., the terminals 108 and 104, respectively. The control units 202–210 determine appropriate paths and route the destination messages 420 and 422 through the paths. Thus, the control units 202–210 establish a destination space 704. The terminals 104–108 launches destination messages to the destination space 704 and receive destination messages from the destination space 704. For example, the terminals 104 and 106 launches destination messages 420 and 422 to the destination space 704 and the terminals 108 and 104, receive the destination messages 420 and 422, respectively, from the destination space 704.

Figure 6:
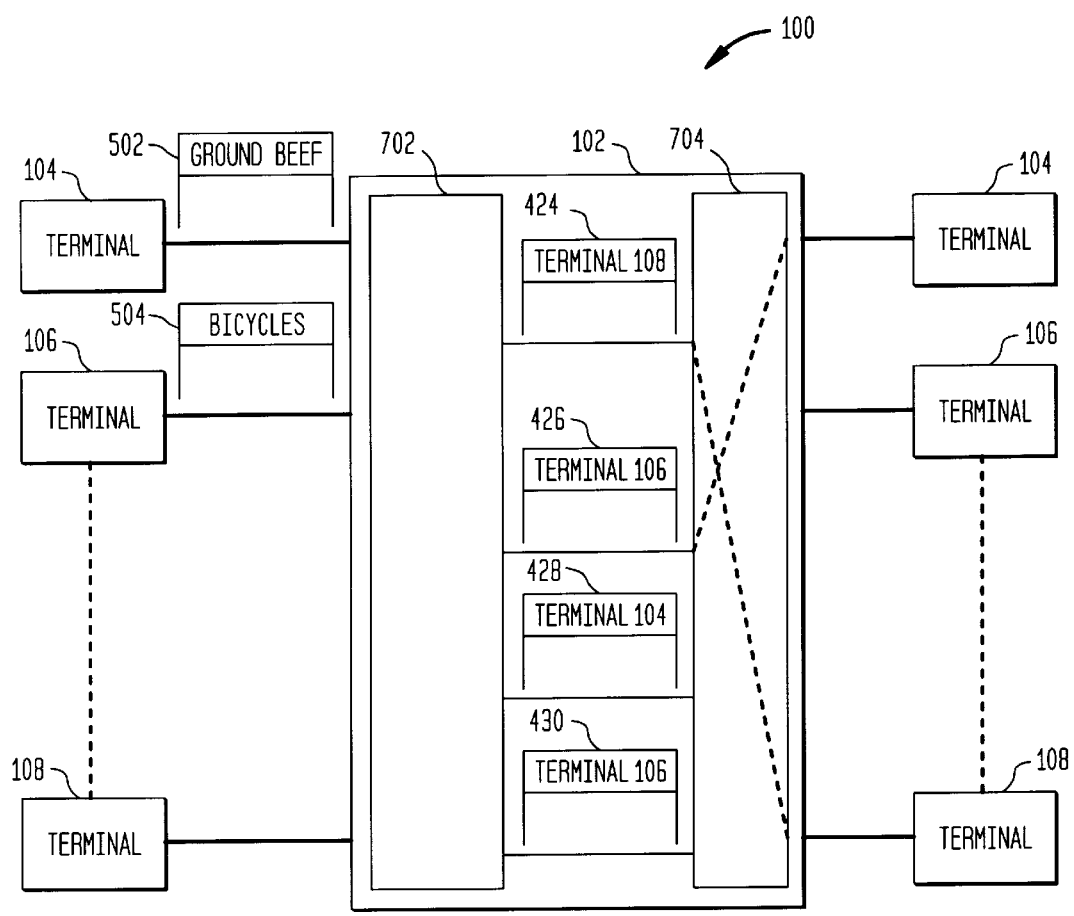
FIG. 6 is a diagram of content messages that are transmitted to a communication circulation system.

FIG. 6 shows a conceptual diagram of a communication circulation device 110 operating within the network 102. The communication circulation device 110 establishes a content space 702 in the network 102 so that the network 102 contains the content space 702 in addition to the destination space 704. Unlike the destination space 704 that receives the destination messages 420 and 422 directed to specific destination addresses, the content space 702 receives content messages directed to a content (area of interest) such as "Ground Beef" or "Bicycles". When a subscriber wishes to communicate with others regarding some content, i.e., an item of possible interest such as ground beef or bicycles, the subscriber enters a content message such as content messages 502 and 504 through the terminal 104, 106 and 108. In contrast to the destination messages 420 and 422, the content messages 502 and 504 have a content identifier in the header section. The content identifier is encoded into a tag that identifies the content message 502 or 504 and the content message 502 or 504 is circulated in the content space 702 based on the tag. The tag is not necessarily an indication of the content of the message in the message section, but is merely a label that the subscriber decides to place on the message. As shown in FIG. 6, the content message 502 has the tag "Ground Beef" and the content message 504 has the tag "Bicycles".

The tags of the content messages 502 and 504 may be generated either by the terminals 104, 106 and 108 or by the communications circulation device 110. For example, a subscriber may enter a message using the terminal 104, a personal computer and select a category from a table of categories that correspond to a content identifier that characterizes the area of interest of the subscriber. Then, after the subscriber selects the category, the personal computer (terminal 104) records the selected category in a coded form in the header section of the content message 502 or 504 as the tag forming the content message.

The categories may be established by the communication circulation device 110 based on projected subscriber needs, subscriber requests, etc. Once determined, the communication circulation device 110 may provide to each of the terminals 102–108 access to the categories. The communication circulation device 110 may also support interactive update of the table of categories so that the categories may be determined in part or in full by the subscribers such as a subscriber specifying faberge eggs for example. In addition, the table of categories may be tailored for specific geographic areas or other group boundaries. The terminals 102–108 may regularly download the table of categories or updates to the categories so that the subscribers may have the latest categories for launching content messages.

Table 1 below shows an example of a set of categories. The left column indicates subject matter that may be selected as a content identifier for a content message. The right two columns indicate a possible code that may be entered into the header section of a content message as a tag. The code may be divided into even and odd codes where even codes indicate a buyer and odd codes indicate a seller, for example. From Table 1, a buyer for bicycles would have a tag of 30000 and a seller for bicycles would have a tag of 30001. Many of the fields in a content message may be similarly coded so that the communication circulation device 110 may efficiently perform the circulation functions.

Table 1 may be arranged so that similar subject matters have addresses that are near each other as measured by the difference in the address values. In this way, matches may be defined in terms of a "neighborhood" of a particular tag. For example, the tag for meat is 11100, ground beef is 11122 and bicycles is 30000. Thus, if the numeric distance is a measure of nearness, then ground beef is "nearer" to meat than to bicycles because the ground beef is 22 from meat but 18878 from bicycles. Other nearness measurement may also be used such as Hamming distance.

TABLE 1

| Content Identifier | Tag | |
|---|---|---|
| | Buy Code | Sell Code |
| Homes | 10000 | 10001 |
| Cars | 20000 | 20001 |
| Bicycles | 30000 | 30001 |
| Meat | 11100 | 11101 |
| Ground Beef | 11122 | 11123 |
| Chicken | 11130 | 11131 |
| Ground Chicken | 11132 | 11133 |
| Lawn Mower | 22300 | 22301 |
| Plumbing | 44610 | 44611 |
| Jogging | 55600 | 55601 |
| Modem | 77600 | 77601 |
| . | | |
| . | | |
| . | | |

Alternatively, the communications circulation device 110 may generate the tags after receiving messages having content identifiers entered by the subscriber. For example, one of the control units 208–210 that interfaces with the terminals 102–108 may select a category using a predetermined algorithm that determines a category based on the content identifier supplied by the subscriber. After a tag is selected and placed in the header section, the newly generated content message is circulated in the content space 702.

Figure 7:
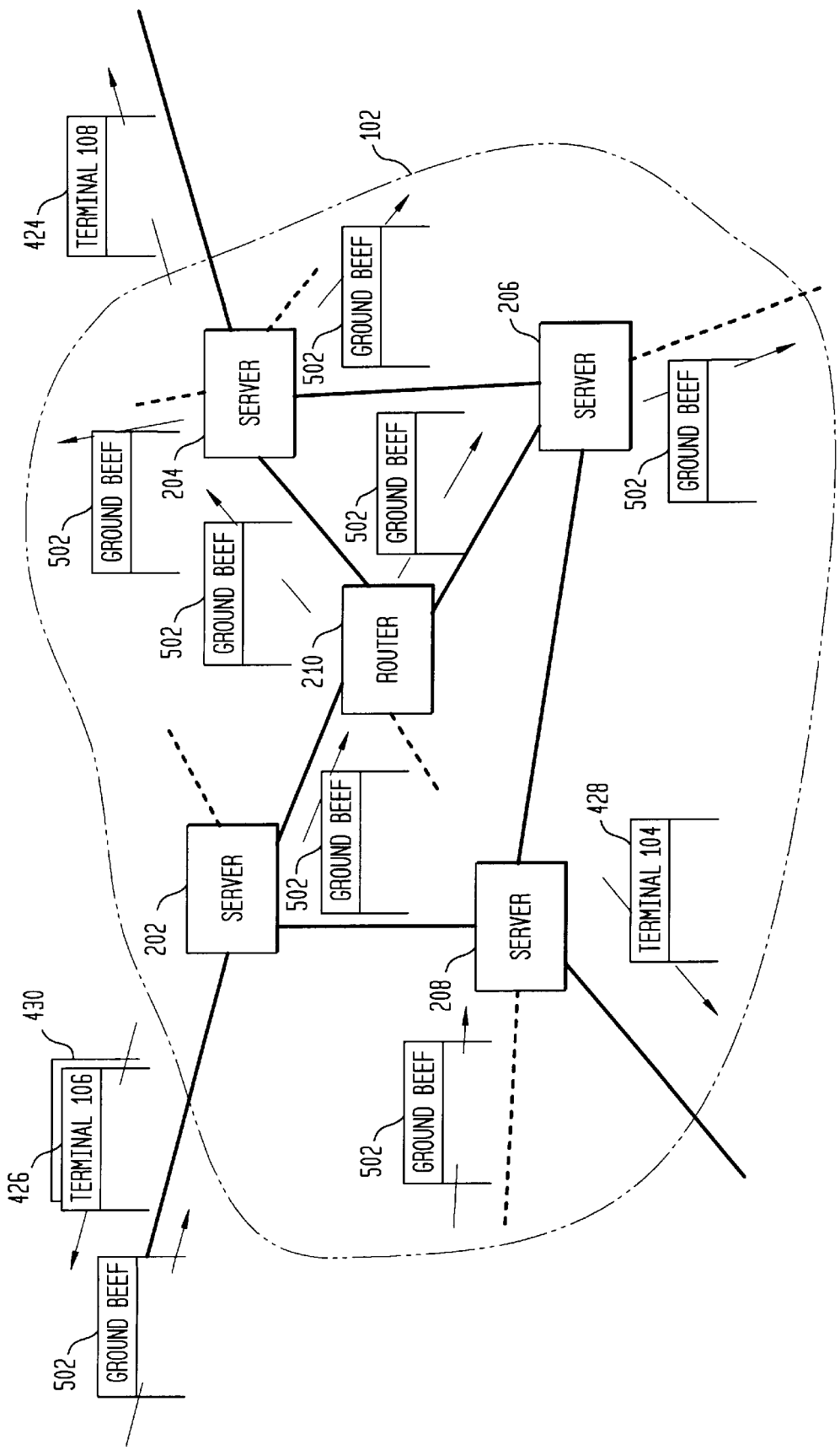
FIG. 7 is an example of a content message circulating in the communication circulation system.

FIG. 7 shows an example of the content message 502 being circulated in the content space 702. The server 202 receives the content message 502 from the terminal 106 and scans the tag. Then, the server 202 retrieves message data and circulation data from a circulation database maintained by the communication circulation device 110. The message data contains information regarding other content messages that has "passed through" the server 202 while the circulation data contains information regarding where best to circulate the content message 502. The server 202 searches the message data for other content messages that may "match" the tag of content message 502. If a "match" was found, the server 202 sends destination messages to the subscribers that launched the matched content messages.

In addition, the server 202 processes the circulation data based on a predetermined algorithm to determine which of the other control units 204–210 to send or direct the content message 502. The circulation data may contain information collected by the control units 202–210 based on the content messages that have passed through each control unit 202–210. For example, the control units 202–210 may be able to determine that other "Ground Beef" messages have been launched by terminals 104–108 connected to the server 204. Thus, the server 202 would direct the content message 502 in a direction toward the server 204 based on such information. For the network topology shown in FIG. 7, the server 202 directs the content message 502 to the router 210 which, is the most direct path to the server 204 from the server 202.

The router 210 also consults the circulation database and, for this example, determines based on the latest circulation data to redirect the content message 502 to the servers 204 and 206. The circulation data may be regularly updated so that new information regarding location of content messages are always available. Thus, while the circulation data retrieved by the server 202 may have indicated that the server 204 is the best place to circulate the content message 502, the circulation data retrieved by the router 210 may indicate that the server 206 may also be desirable. As shown in FIG. 7, the control units 202–210 may replicate received content messages 502 and redirect each of the replicated content messages 502 to different parts of the network 102.

The server 206 receives the redirected contents message 502 from router 210 and further redirects the content message 502 to other portions of the communication circulation device 110. The server 204 further replicates the redirected content message 502 and directs the replicated content message 502 to other portions of the communications circulation device 110. Thus, the content message 502 is passed from one control unit 202–210 to other control units 202–210 as directed by the circulation data in the circulation database maintained by the communications circulation device 110. In this way, the content message 502 is circulated in the communication circulation device 110.

As discussed in relation to the server 202, each of the control units 202–210 visited by the content message 502 also determines whether other content messages having tags corresponding to the tag of the content message 502 have passed through the control units 202–210. If other content messages having corresponding tags have passed through, each of the control unit 202–210 generates destination messages to the subscribers of the content messages to inform them of the "match".

For example in FIG. 7, the server 204 and 208 have discovered such matches and informs the terminals 108 and 104 of the match by sending destination messages 424 and 428 to the terminals 108 and 104, respectively. Destination messages 426 and 430 directed to the terminal 106 are also launched by the servers 204 and 208 to inform the terminal 106 of the matches. In the above manner, the subscribers that launched the matched content messages are informed of the match and may establish communication with each other.

As shown in FIG. 6, the destination messages 424–430 are generated within the content space 702 and output to the destination space 704 to inform the source terminals of the respective matching content messages of the matches. Other destination messages may also be generated for purposes such as status reporting regarding the extent of the circulation or the number of "near" matches where "near" may be defined as within a preset number of items in the table of categories, for example, (or Hamming distance of the address value in the table).

Figure 8:
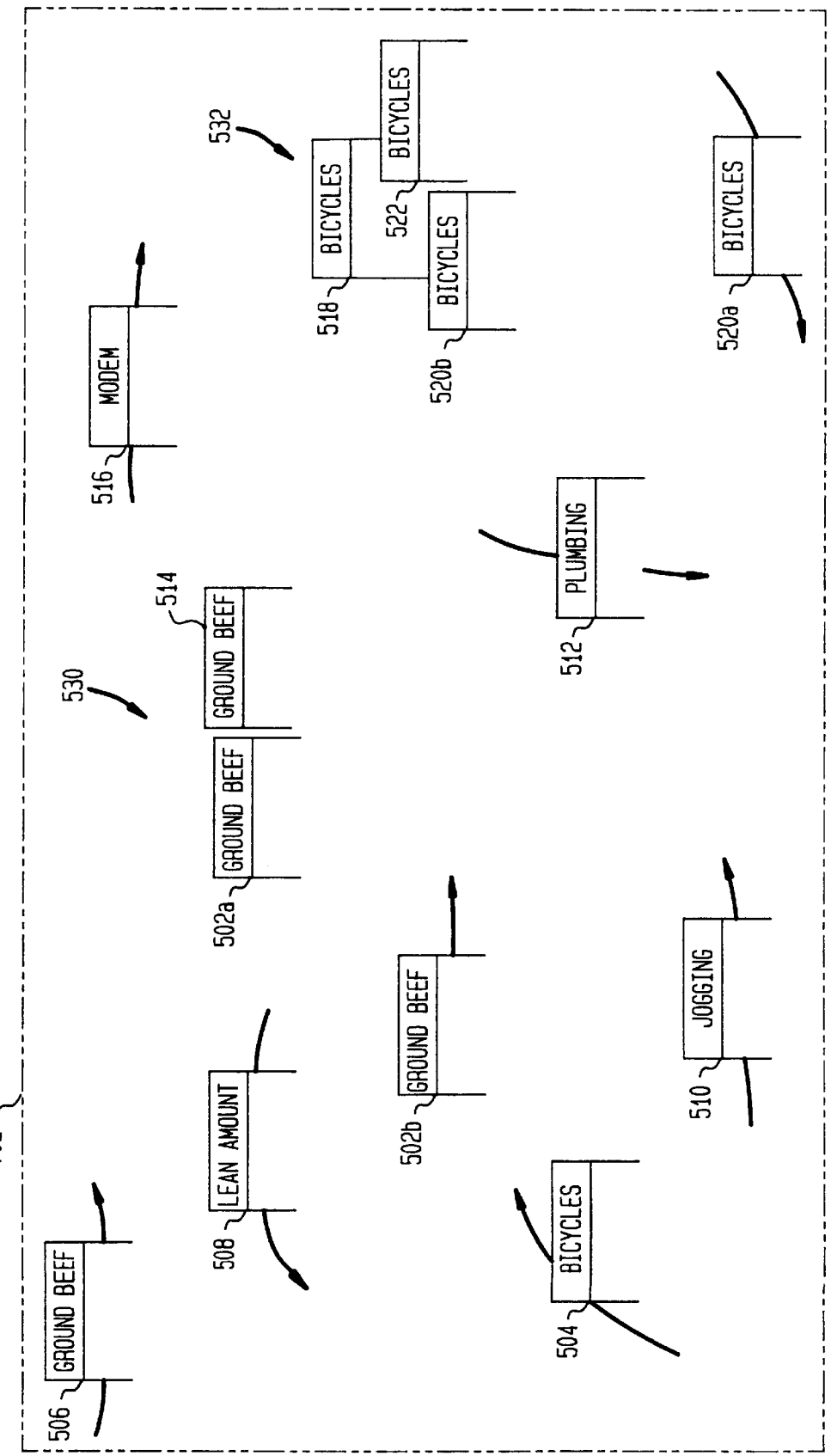
FIG. 8 is a conceptual diagram of the content space.

FIG. 8 shows a conceptual diagram of the content space 702 having content messages 502–522 circulating in the content space 702. Those content messages 502b–512, 516 and 520a having arrows indicate that the content messages 502b–512, 516 and 520a continue to circulate without finding any matches while those content messages 502a, 514, 518, 520b and 522 that do not have arrows indicate that a match has been discovered. In FIG. 8, there are two groups 530 and 532 of content messages where matches are found. The group 530 includes "Ground Beef" content messages 502a and 514 and the group 532 includes "Bicycles" content messages 518, 520 and 522. While the content messages 502a and 520b have found matches as indicated by the groups 530 and 532, other replicated copies of the content messages 502b and 520a continue to circulate in the content space 702.

Figure 9:
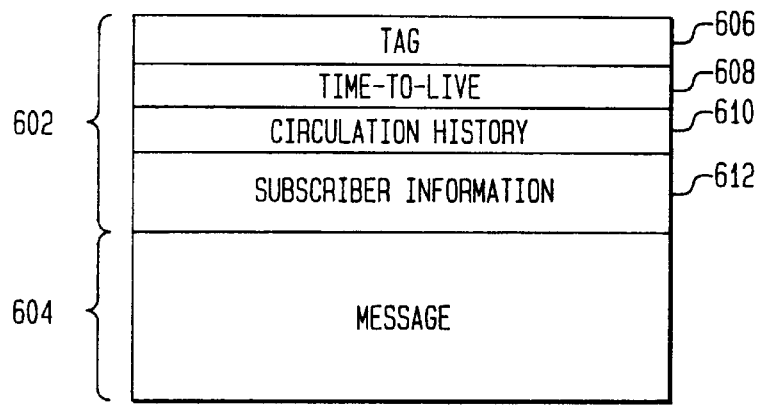
FIG. 9 is a diagram of a content message.

FIG. 9 shows an exemplary diagram of a content message 600. The content message 600 has a header section 602 and a message section 604 similar to the destination message example shown in FIG. 4. The header section 602 may include information such as a tag 606, a time-to-live parameter 608, a circulation history 610 and subscriber information 612. Other information may also be included such as a CRC for message integrity verification, for example. The time-to-live parameter 608 indicates the amount of time remaining that the specific copy of the content message 600 is allowed to circulate in the communication circulation device 110. The time-to-live parameter 608 is decremented by the control unit 202–210 when the content message 600 passes through. When the time to live parameter 608 is decremented to zero or less, the content message 600 may be simply deleted and "dies". Optionally, the control unit 202–210 that deletes the content message 600 may send a destination message to the source terminal 102–108 of the content message 600 to indicate that the content message 600 has "died".

The circulation history 610 may include a list of all the control units 202–210 that have been traversed by the content message 600. For example in FIG. 7, the content message 502 that is redirected by the server 204 may have a circulation history 610 of server 202, router 210 and server 204. The circulation history 610 may be used by the control unit 202–210 to make future redirection decisions.

The subscriber information 612 may include the source terminal identification and any message handling parameters set by the subscriber. For example, the subscriber may indicate that a destination message need not be sent to the subscriber when the content message 600 dies. The subscriber information 612 may also include instructions for desired actions when a match is made. For example, the subscriber information 612 may instruct the control unit 202–210 to send the message in the message section 604 to the subscriber of a matching content message 600 when the matching content message 600 is found without returning a destination message to the subscriber of the content message 600. In this way, the subscriber simply sends a message to someone with an area of interest identified by the tag.

Figure 10:
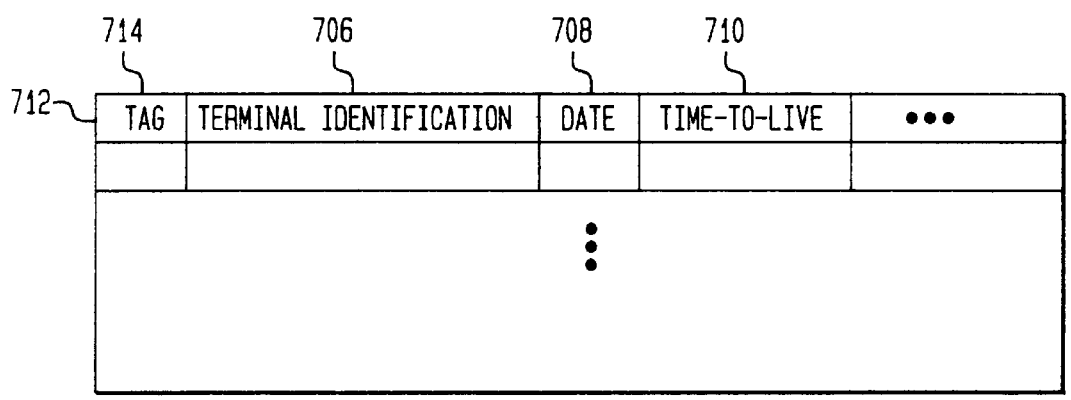
FIG. 10 is a diagram of message data.
Figure 11:
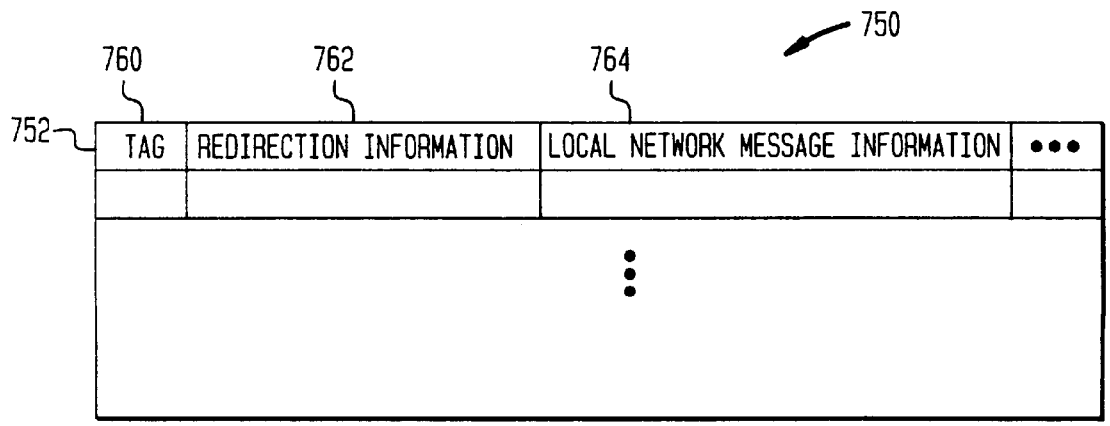
FIG. 11 is a diagram of circulation data.

FIGS. 10 and 11 show examples of the message data and circulation data in the circulation database maintained by the communication circulation device 110. As discussed above, the control units 202–210 retrieve circulation data and message data from the circulation database for redirecting a content message 600 to other control units 202–210 and to determine whether a match has occurred. The circulation database may be centralized at a particular location in the communication circulation device 110 or distributed among the control units 202–210. When distributed, each of the control units 202–210 maintains information relevant to itself and share its information with other control units 202–210 so that local information pertinent to the specific control unit 202–210 may be accessed immediately while information global to the communication circulation device 10 may be communicated among the control units 202–210. In the following discussion, a distributed circulation database is assumed.

FIG. 10 shows an example of the message data 700. The message data 700 includes tag entries 712 that correspond to the content messages 600 that have passed through a particular control unit 202–210. Each of the tag entry 712 includes fields such as a tag field 714, a subscriber identification field 706, a date field 708 and a time-to-live field 710. The fields of the tag entry 712 indicate information related to a particular content message 600. The tag field 714 indicates a tag of the content message 600; the subscriber identification field 706 indicates the source terminal address of the content message 600, for example; the date field 708 indicates the date that the content message 600 was passed to the control unit 202–210; and the time-to-live field 710 indicates the time remaining for the content message 600 to be remembered by the control unit 202–210. The control unit 202–210 decrements a value in the time-to-live field 710 until the value becomes zero or negative, for example. When the value becomes zero or negative, the tag entry 702 corresponding to the content message 600 is deleted from the message data 700, thus, erasing the memory of the content message 600 in the control unit 202–210.

The value in the time-to-live field 710 may be different from the value in the time-to-live field 608 of the content message 600. The time-to-live field 710 relates to the "persistence" of a content message 600 in a control unit's 202–210 message data. Thus, as the content message 600 traverses a series of control units 202–210, a "trace" of the path traversed by the content message 600 is generated. This trace provides a greater "presence" of the content message 600 for increasing the match success rate. The persistence may be set based on memory limitations of the control units 202–210, for example.

When a content message 600 is received, the control unit 202–210 searches the message data 700 for a tag entry 702 that contains a tag in the tag field 704 that corresponds to the tag of the content message 600. The value in the tag field 704 is determined to "match" the tag of the content message 600 when predetermined criteria are met. For example, if the tag of the content message is "Ground Beef", then a list of possible tag values may be considered to "match" the "Ground Beef" tag. For example: meat, chopped beef, or beef stuffing may "match" "Ground Beef". The list of possible tag values may be specified by a nearness value, for example.

FIG. 11 shows the circulation data 750. The circulation data 750 includes tag entries 752 corresponding to each possible tag in the table of categories. The tag entry 752 includes fields such as a tag field 760, a redirection information field 762 and a local network message information field 764. The tag field 760 indicates a tag corresponding to one of the categories of the communication circulation device 110. The redirection information field 762 include information regarding other portions of the communication circulation system 110 that a content message 600 having the tag indicated in the tag field 760 may be redirected. For example, the circulation data 750 associated with the router 210 may have a tag entry 752 corresponding to the tag "Ground Beef". The redirection information field 762 of the "Ground Beef" tag may include servers 204 and 206. Thus, the router 210 redirects the ground beef content message 502 to servers 204 and 206 as indicated in FIG. 7.

The local network message information field 764 of a particular control unit 202–210 may include information indicating the presence of content messages 600 having tags that may match the tag indicated in the tag field 760 within control units 202–210 that are closely connected with the particular control unit 202–210. Thus, the control units 202–210 may be organized into groups representing geographical locations, for example. When a content message 600 passes through members of a group, all the control units 202–210 of the group may be informed of the presence of the content message 600 and record the information in the local network information field 764 of each respective control unit 202–210. In this way, a content message 600 is not required to pass through every control unit 202–210 in a geographical area to achieve a "match" condition.

Figure 12:
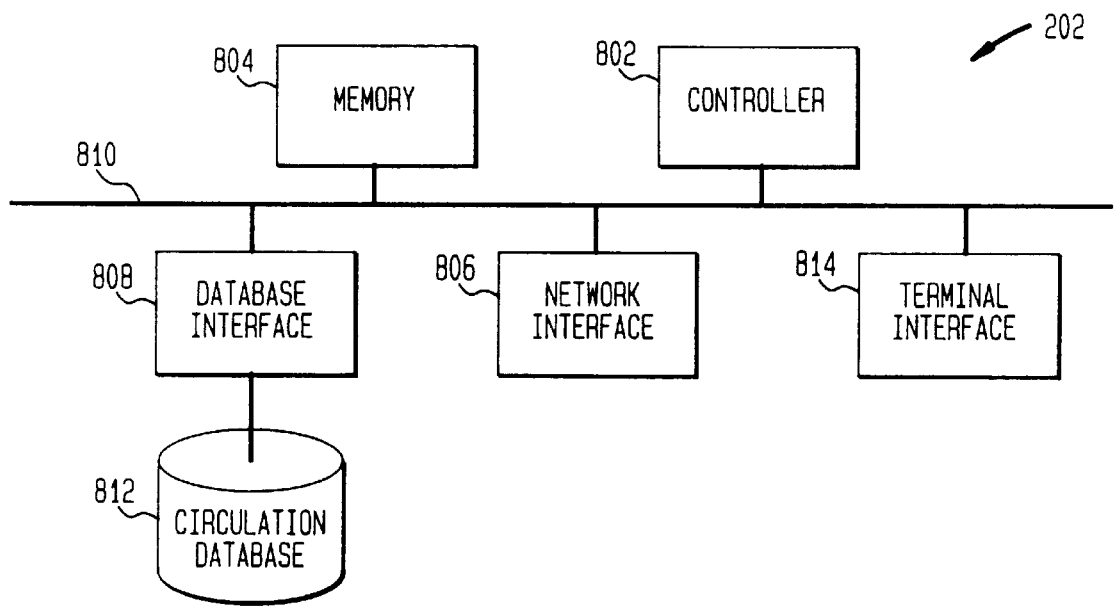
FIG. 12 is a block diagram of a server in the communication circulation system.

FIG. 12 shows an examplary block diagram of the server 202 in the communication circulation device 110. The diagram of the server 202 is exemplary of all the control units 202–210 of the communication circulation device 10. The server 202 includes a controller 802, a memory 804, a terminal interface 814, a network interface 806 and a database interface 808. All of the above components are coupled together via a signal bus 810. The database interface 808 is coupled to a circulation database 812.

The controller 802 receives a message from a subscriber through the terminal interface 814. In this example, the controller 802 retrieves the table of categories from either the memory 804 or the circulation database 812 through the database interface 808 to generate a tag for the message based on a content identifier received from the subscriber to form a content message 600. The controller 802 also receives other information from the subscriber through the terminal 814 such as time-to-live for the message and the subscriber preferences discussed above in reference to FIG. 9. Based on the table of categories, the content identifier and the subscriber preferences, the controller 802 generates a tag and formats the tag in the tag field 606 of the header section 602. The controller 802 also formats other header information such as the time-to-live field 608 and the subscriber information field 612.

The controller 802 also retrieves from either the memory 804 or the circulation database 812 the message data 700 and searches through the message data 700 for a tag entry 712 that matches the tag generated for the content message 600. If a tag entry 712 is identified that "matches" the generated tag, the controller 802 returns a message to the subscriber indicating that a match is made and sends to the subscriber the subscriber identification 702 of the matched content message 600 and any relevant information requested by the subscriber.

The controller 802 also retrieves from the memory 804 or the circulation database 812 the circulation data 750. The controller 802 retrieves the redirect information 762 and local network message information 764 from a tag entry 752 that corresponds to the generated tag. If the local network message information 764 indicates that content messages 600 that match the generated tag have passed through the group to which the server 202 belongs, the controller 802 sends messages to the appropriate control unit 204–210 through the network interface 806 to retrieve the relevant information regarding the matched content messages and forwards them to the subscriber through the interface 814.

In addition, the controller 802 may also launch the newly generated content message to other control units 202–210 as indicated by the redirection information 762 to commence circulating the new content message 600. If required, the controller 802 makes multiple copies of the new content message 600 for multiple launches.

If a content message 600 is received through the network interface 806, the controller 802 decrements the value in the time-to-live field 608 and determines whether the received content message 600 has died. If the received content message 600 has died, the controller 802 deletes the content message 600, informs the subscriber via a destination message if requested by the subscriber and performs no further action. However, if the received content message 600 did not die, the controller 802 processes the content message 600.

The controller 802 processes the received content message by retrieving the message data 700 from either the memory 804 or the circulation database 812 and search for a corresponding tag entry 712 that matches the tag 606 of the content message 600. If a tag entry 712 is found to match the tag 606 of the received content message 600, the controller 802 sends destination messages to both the subscribers of the received content message 600 and the matched content message 600 through the network interface 806.

In addition, the controller 802 also retrieves the local network message information 764 in the tag entry 752 of the circulation data 750 to determine whether any content messages 600 have passed through the group to which the server 202 belongs.

The controller 802 also retrieves the tag entry 752 corresponding to the tag of the received message from the circulation data 750. The controller 802 correlates the redirection information 762 of the retrieved tag entry 752 with the circulation history 610 of the received content message 600. If the redirection information 762 indicates portions of the network through which the received content message 600 has not yet passed, the controller 802 replicates and launches the received content message 600 to those portions of the network through which the content message 600 has not passed or has died.

While the above description is an example of a server 202 that includes a terminal interface 814 to a subscriber, other control units 204–210 such as the router 210 that do not have subscriber interfaces 814 receives and redirects content messages 600 in a similar way as described above. Also, the above description is an example of a possible scheme for handling content messages 600. Other schemes are possible to efficiently locate matching content messages by circulating the content messages to maximize intersections of message paths.

Figure 13:
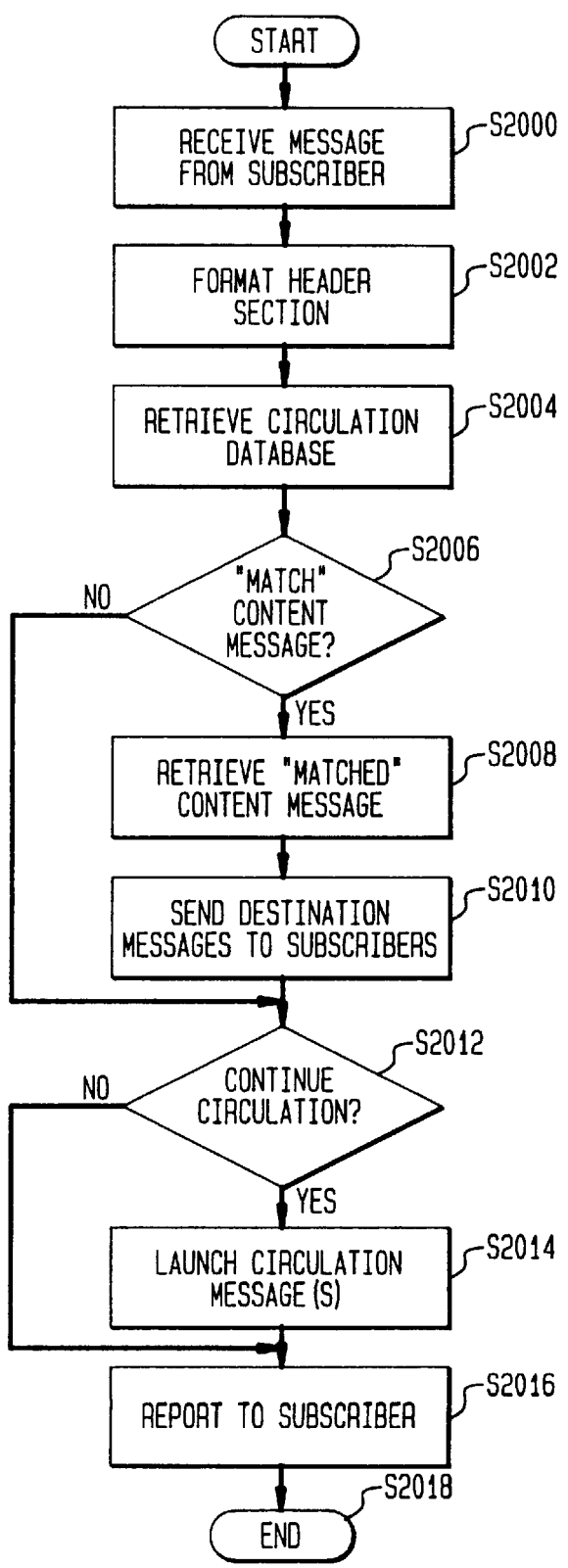
FIG. 13 is a flow chart of a server process.

FIG. 13 shows a flowchart of a process of the controller 802 for receiving a content message from a subscriber and launching the content message 600. In step S2000, the controller 802 receives a message from the subscriber and goes to step S2002. In step S2002, the controller 802 formats the header section 602 and goes to step S2004. In step S2004, the controller 802 retrieves the circulation database 812 through the database interface 808 and goes to step S2006. The circulation database 812 may also be stored in the memory 804 in which case it need not be retrieved.

In step S2006, the controller 802 determines whether there are matched content messages 600 by searching through the local network message information 764 of the circulation data 750. If a match content message 600 is identified, the controller 802 goes to step S2008; otherwise, the controller 802 goes to step S2012. In step S2008, the controller retrieves the match content message 600 and goes to step S2010. In step S2010, the controller 802 sends destination messages to the respective subscribers of the corresponding match content messages and goes to step S2012.

In step S2012, the controller 802 determines whether the content message should continue circulation based on subscriber's instructions, for example. If circulation is to continue, the controller 802 goes to step S2014; otherwise, the controller goes to step S2016. In step S2014, the controller 802 launches the content message 600 through the network interface 806 based on redirection information 762 and goes to step S2016. In step S2016, the controller 802 reports to the subscriber the status of the content message 600 and goes to step S2018 and ends the process.

In the above description, the communication circulation device 110 receives content messages 600 from subscribers and circulates the content messages 600 throughout the communication circulation device 110. When two contents messages 600 having "matched" tags intersect in their circulation paths, the communication circulation device 110 detects a "match" and informs the corresponding subscribers of the matched condition. Thus, the communication circulation device 110 takes no positive action to seek out matching content messages 600. Rather, the communication circulation device 110 merely circulates the content messages 600 until a match occurred and reports the match. The embodiment of the communication circulation device 110 described below provides for agents within the communication circulation device 110 to actively search for other content messages 600 and have as its goal to obtain a match for a subscriber's content message 600.

Figure 14:
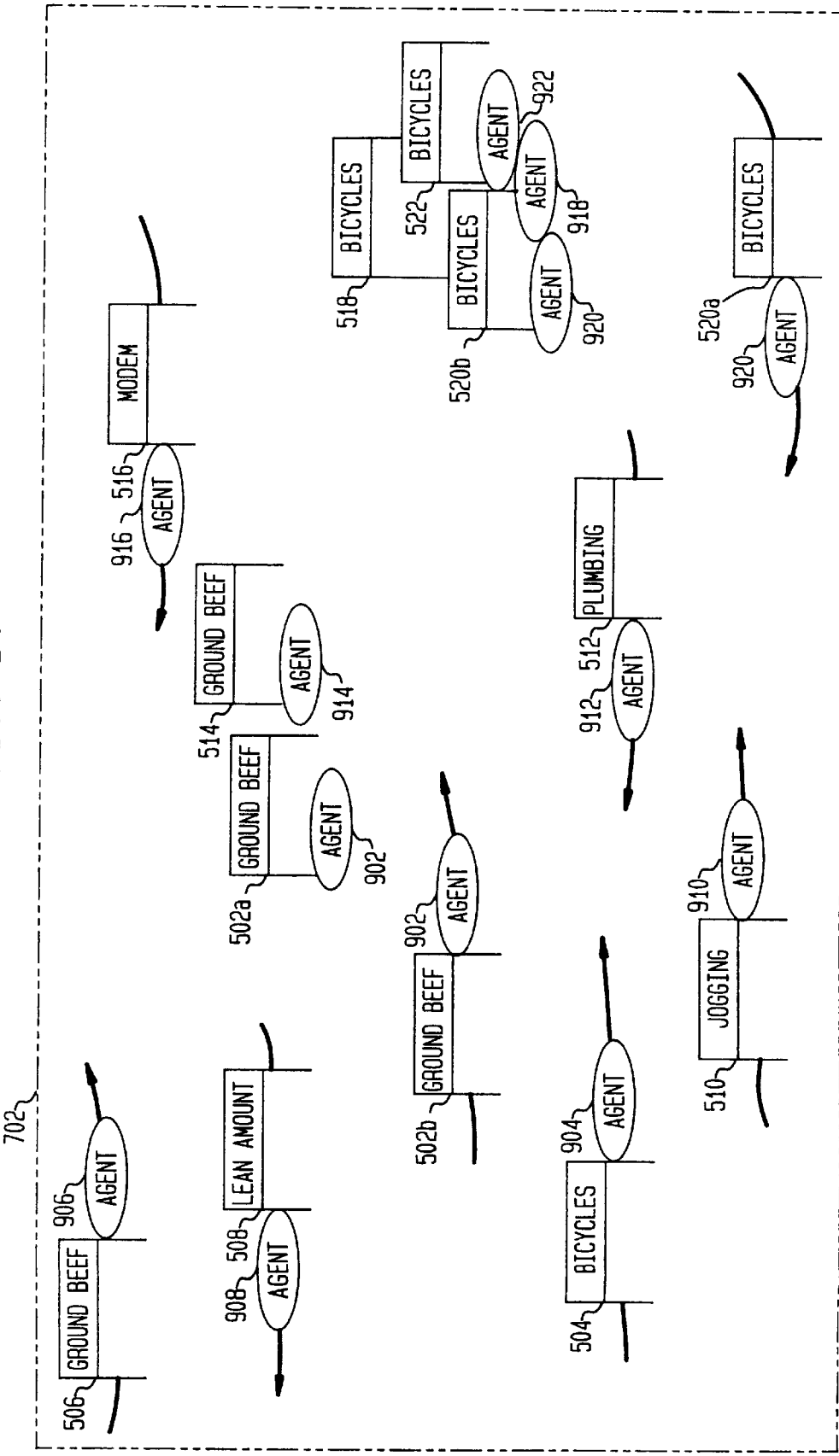
FIG. 14 is a diagram of agents operating in the content space.

FIG. 14 shows the content space 702 containing content messages 502a–522 serviced by agents 902–922. Instead of circulating through the content space 702 via the redirection process of the communications circulation device 110, the content messages 502a–522 are circulated in strategic locations in the content space 702 by the directions of the respective agents 902–922. For example, the content message 506 is circulated in the left corner of the content space 702 by the agent 906 while the content message 520a is circulated in the lower right corner of the content space 702 by agent 920.

As indicated in FIG. 14, the content messages 502a and b are copies of the same content message 502 and handled by a single agent 902. Similarly, the content messages 520a and b are handled by a single agent 920. Also, the content message 502a and 514 are not circulating but are in a "negotiation" phase where the agents 902 and 914 are exchanging terms to determine whether a "match" has been achieved. Similarly, the content messages 518, 520b and 522 are in the negotiation phase.

Figure 15:
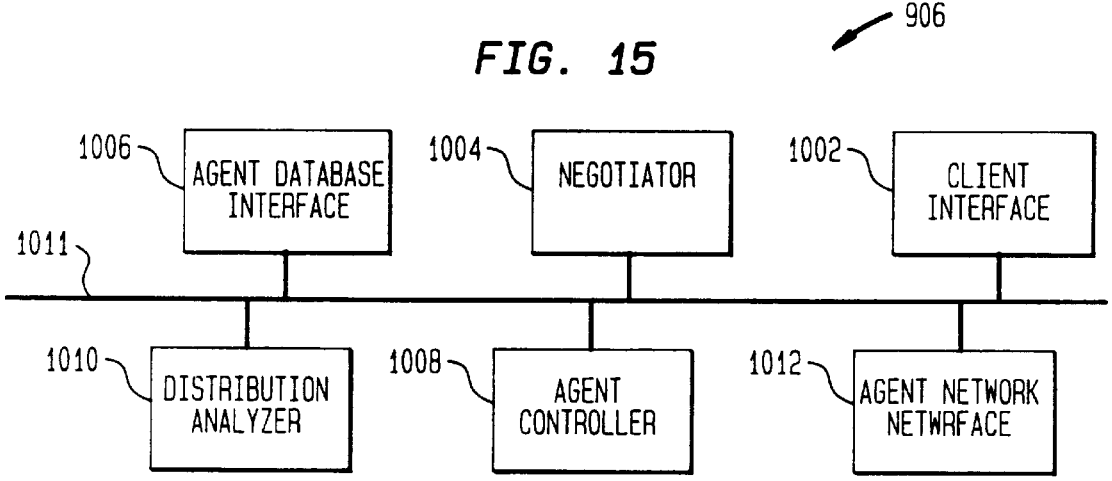
FIG. 15 is a block diagram of an agent.

FIG. 15 shows a block diagram of the agent 906 as an example. The agent 906 includes an agent controller 1008, a client interface 1002, a negotiator 1004, an agent database interface 1006 and a distribution analyzer 1010. The above components are coupled through signal bus 1011. While different agents may have widely varying characteristics as may be provided by agent services, the description of the agent 906 illustrates a type of function that agents 902–922 may perform.

When a client of a particular agent service requests the service of an agent 902–922 through the client interface 1002, the agent controller 1008 receives the client's content message 600 and enters an agent identification in the header section 602 of the content message 600. In this way, as the content message 600 is circulated in the communication circulation device 110, the content message 600 may be processed by the appropriate agent 902–922 following a circulation scheme as dictated by the agent 902–922. The agent controller 1008 also updates an agent database via the agent database interface 1006 by generating an entry in the agent database that stores the appropriate information relating to the received content message 600.

FIG. 16 shows an example of a message entry 950 in an agent database. The message entry 950 may include information regarding the client's content message 600 stored in different fields 952–958. For example, the field 952 may store locations of all living copies of the client's content message 600; the field 954 may store a match history; the field 956 may store circulation parameters; and the field 958 may store client instructions. The agent controller 1008 interacts with the client to receive client instructions when the client first submits the content message 600 to the agent 906. Additional client instructions may be received during the subsequent times as the client feels the need to add to or alter prior instructions and as the circumstances dictate.

After receiving the client's content message 600, the agent 906 may first determine whether other content messages 600 that may "match" the client's message by retrieving the circulation database 812 maintained by the communication circulation device 110 or a similar database maintained by the agent 906. If a potential match is discovered, the agent controller 1008 retrieves the potentially matching content messages 600 or contacts the respective agents 902–904 and 908–922 through the negotiator 1004 to negotiate a "match".

The agent 906 may also retrieve the circulation data 750 as maintained by the communication circulation device 110 to retrieve the local network message information 964 to identify potentially matching content messages 600 and also to retrieve redirection information 762 for strategizing a "best" circulation scheme. For example, the agent 906 may apply special circulation processes to distribute copies of the client's content message 600 in such a way as to achieve match conditions in a minimal amount of time. The parameters to control such circulation processes are stored in the circulation process parameters in the field 956 of the message entry 950. The agent controller 1008 determines a distribution via the distribution analyzer 1010 based on the circulation process parameters and other information such as the redirection information 762. After the distribution analyzer 1010 determines the best distribution of the client's content message 600, the client's content message 600 is launched into the communication circulation device 110 through the agent network interface 1012. The agent controller 1008 stores the locations of all living copies of the client's content message in the field 952 of the message entry 950.

The agent 906 may be distributed throughout the communication circulation device 110 as a program, for example, executing in each of the control units 202–210 and/or as an ASIC associated with each of the control units 202–210. Thus, when the client's content message 600 is launched, the agent 906 operating in the receiving control units 202–210 receive the client's content message 600 and process the client's content message 600 appropriately according to the scheme implemented by the agent 906.

The agent database containing all the message entries 950 related to the agent 906 may be stored at a central location of the agent service provider. As each of the agents 906 located at various control units 202–210 receives the client's content message 600, the message entry 950 related to the client's content message 600 is retrieved from the service provider's message database 950 and the client's content message 600 is processed accordingly.

When the agent 906 launches copies of the client's content message 600 and when the client's content message 600 is redistributed by the agents 906 located in the control units 202–210, the field 952 is updated so that the agent 906 may identify all the locations that the client's content message 600 is being circulated.

When a potential match is discovered, the agent 906 either scans the header section 602 of the prospective matching content message 600 or interfaces with an agent 902–904 and 908–922 of the prospective matching content message 600 to negotiate the terms of the match. In contrast to the "match" discussed earlier, the agents 902–922 may implement a much more sophisticated match process as will be discussed later. As matches are discovered or near matches are encountered, the agents 902–922 stores the history of matches (and new matches if desired) in the field 954 of the message entry 950 so that as time progresses the client may choose to accept a less ideal match based on the match history if circumstances so dictate. For example, if the client originally desired ground beef at $0.59 per pound but discovers that the "market" for ground beef is at $0.89 per pound. After a few weeks of searching, the client may choose to select a higher priced match than when the content message 600 was first launched.

As suggested above, the agents 902–922 operating in the communication circulation device 110 may serve as a basis for implementing an electronic marketplace where content messages 600 are submitted to the agents 902–922 by buyers and sellers of various products and services. For example, FIG. 17 illustrates a content message 520a for purchasing bicycles. The tag 550 indicates that the content message 520a seeks to buy bicycles (i.e., an even code for the tag). The content message 520a has a time-to-live of 90 days from Sep. 1, 1998, as indicated by the time-to-live field 552.

The fields 554–560 indicate four levels of negotiation. When the agent 920 identifies a potential match content message 600 and enters into the negotiation stage, the negotiator 1004 of the agent 920 will first verify whether the brands of bicycles offered by a seller content message 600 falls within the specifications found in level 1 condition indicated in the field 554. In this case, the buyer has specified a 1995 model A of brand X or a 1996 model B of brand Y. Thus, if the seller's content message 600 is offering brand Z for sale, then the negotiator 1004 would stop negotiation because the buyer's level 1 specification has not been met. However, the agent controller 1008 records in the match history field 954 of the message entry 950 that a seller of brand Z bicycles was encountered. If no suitable seller has been matched near the end of the 90-day time-to-live limit, the buyer (client) may choose to relax the level 1 specification and deal with the brand Z seller. In this case, the buyer may send client instructions to the agent 920 and may also change the price requirement, for example.

The level 2 condition in the field 556 indicates a price range of $100–$150. Thus, when a seller for either a brand X or a brand Y bicycle of the desired model and year is identified, the negotiator 1004 may negotiate a best price within the range specified by the level 2 condition. The level 3 condition in the field 558 indicates that the buyer prefers brand X over brand Y. Thus, the negotiator 1004 may decide to pay more for a brand X than for a brand Y bicycle. The level 4 condition in the field 560 also indicates a preferred availability date of Nov. 1, 1998. Thus, the negotiator 1004 may refuse to close a deal if the preferred availability date is still in the future. However, if the preferred availability date is passed, the negotiator 1004 may choose to close a deal even if the price is close to the maximum dollar range specified by the buyer in the field 556.

The circulation history field 562 permits the negotiator 1004 to review the extent of coverage of the buyers content message 520a. Thus, if the circulation has not been extensive, the negotiator may choose to wait before closing deals even if the deals may be at first attractive. However, if the circulation history indicates that the content message 520a has had extensive coverage and yet only a few sellers are available that satisfies the buyer's requirements as indicated in the conditions of the fields 554–560, the negotiator 1004 may choose to close deals with higher prices than initially thought reasonable. When a deal is closed or when conditions specified by the client's instructions 958 in the message entry 950 are required, the negotiator 1004 may contact the client by sending a destination message to the client at the address/identification indicated in field 564 of the content message 520a, as shown in FIG. 17.

While the fields 550–564 include all the necessary information for completing a negotiation, the message field 566 may be transmitted to the seller during certain stages of the negotiation process to inform the seller of the buyer's intention and perhaps obtain a better deal. For example, the message in the field 566 indicates that a total of 50 bikes are desired and more bikes may be considered if available. Thus, the seller may perceive that this particular buyer is a large business buyer and may choose to lower the sell price in anticipation of future business.

The above example of a negotiation process using the content message 520a is an electronic marketplace where buyers and sellers are represented by respective agents 902–922 which are empowered to carry out negotiations. Thus, the content space 702 established by the communication circulation device 110 provides a medium in which marketplace transactions may take place. Various agent service providers may offer different types of services for business and personal transactions. In this way, a more efficient marketplace may be implemented allowing buyers and sellers to have national and, indeed, worldwide exposure without the cost and expense of human agents. In addition, contact with the agents 902–922 to obtain status of the negotiation may be immediate without delays often encountered with human agents.

Figure 18:
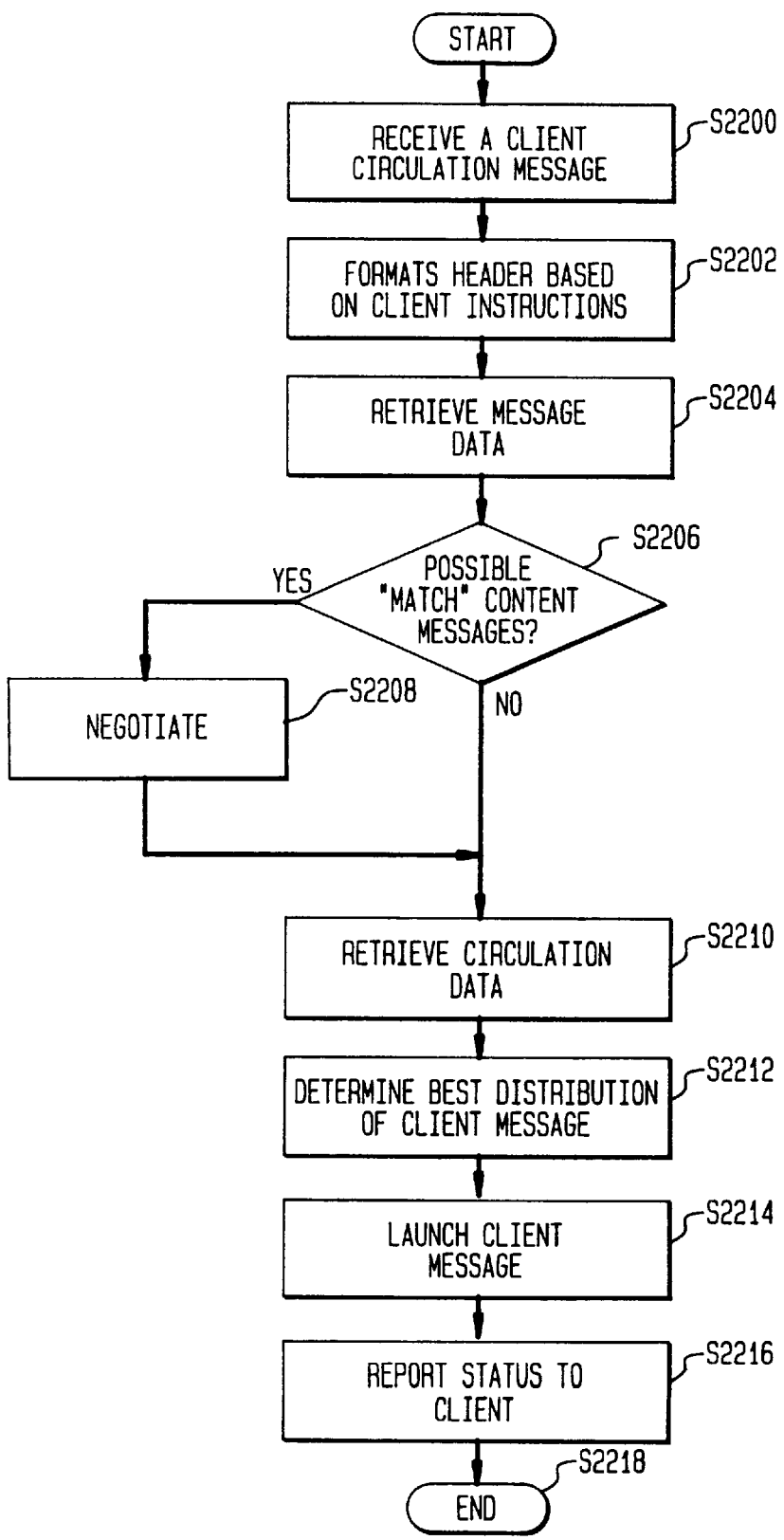
FIG. 18 is a flowchart of an agent process.

FIG. 18 shows a flowchart for an example agent process. In step S2200, the agent controller 1008 receives a client content message through the client interface 1002 and goes to step S2202. In step S2202, the agent controller formats the header section 602 based on client instructions and goes to step S2204. In step S2204, the agent controller 1008 retrieves information such as message data 700 and/or the local network message information 764 from the circulation data 750 to determine whether there are any other content messages 600 that "match" the client content message. Then the agent controller 1008 goes to step S2206. In step S2206, the agent controller 1008 determines whether there are possible match content messages 600. If there are possible match content messages 600, the agent controller 1008 goes to step S2208 and transfers control to the negotiator 1004 to negotiate a match; otherwise the agent controller 1008 goes to step S2210. In step 2208, the negotiator negotiates a match and either ends the process or returns control to the controller 1008 at step 2210.

In the step S2210, the agent controller 1008 transfers control over to the distribution analyzer 1010 which in turn retrieves redirection information 762 from the circulation data 750. The distribution analyzer 1010 goes to step S2212 to determine the best distribution of the client's content message 600 and returns control to the agent controller 1008 at step S2214. In step S2214, the agent controller 1008 launches client's content message(s) 600 through the agent network interface 1012 and goes to step S2216. In step S2216, the agent controller 1008 reports status to the client through the client interface 1002 and goes to step S2218 and ends the process.

Figure 19:
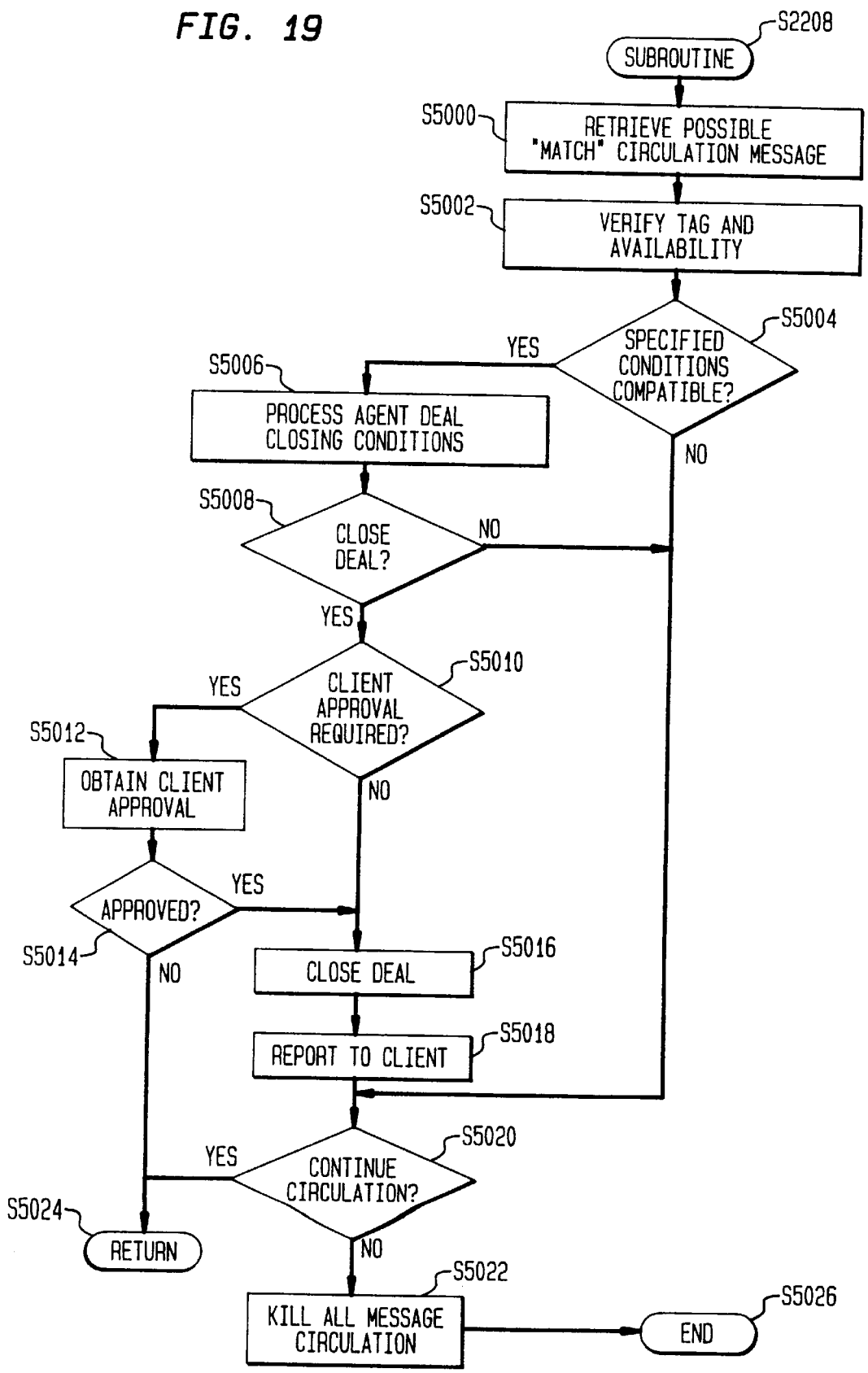
FIG. 19 is a flowchart of a negotiation process.

FIG. 19 shows an example for a negotiation process corresponding to step S2208 of FIG. 18. In Step S5000, the negotiator 1004 retrieves possible match content messages 600 identified by the local network message information 764, for example. Then the negotiator 1004 goes to step S5002. In step S5002, the negotiator 1004 verifies that the tags of the content messages 600 correspond to one another and that the products or services offered by the possible match content messages are still available and then goes to step S5004.

In step S5004, the negotiator 1004 determines whether the specified conditions in the client's content message 600 and the possible match content messages 600 are compatible. If compatible, the negotiator 1004 goes to step S5006; otherwise the negotiator 1004 goes to step S5020.

In step S5006, the negotiator 1004 processes agent deal closing conditions. These conditions include considering the circulation history of the client's content message 600, the time remaining for the client's content message 600 to live, and client instructions in the client instruction portion 958 of the message entry 950, for example. Then, the negotiator 1004 goes to step S5008. In step S5008, the negotiator 1004 determines whether to close a deal with a prospective match content message 600. If the conditions are such that a deal may be closed with a matched content message 600, the negotiator 1004 goes to step S5010; otherwise the negotiator 1004 goes to step S5020.

In step S5010, the negotiator 1004 determines whether client approval is required before a deal is closed. If approval is required, the negotiator 1004 goes to step S5012; otherwise the negotiator 1004 goes to step S5016. In step S5012, the negotiator 1004 obtains client approval by sending a destination message to the client through the client interface 1002 and goes to step S5014. In step S5014, the negotiator 1004 receives the client's approval or disapproval. If approved, the negotiator 1004 goes to step S5016; otherwise, the negotiator 1004 goes to step S5024 and returns to the calling process such as step S2210 in FIG. 18.

In step S5016, the negotiator 1004 closes the deal with a matched content message 600 and goes to step S5018. In step S5018, the negotiator 1004 reports to the client of the closed deal and goes to step S5020. In step S5020, the negotiator 1004 determines whether the client desires to continue circulating the content message 600. This determination may be made based on client instructions in the client instruction field 958 of the message entry 950 or by interacting with the client through the client interface 1002, for example. If the client desires to continue the circulation, the negotiator 1004 goes to step S5024 and returns to the calling process; otherwise, the negotiator 1004 goes to step S5022. In step S5022, the negotiator 1004 kills all the client content messages 600 that are currently circulating by retrieving locations of all living copies of the client's content message 600 from the field 952 of the message entry 950, for example. The negotiator 1004 may issue a kill message to terminate all copies of the client content message 600. Then, the negotiator 1004 goes to step S5026 and ends the process.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention as defined in the following claims.

What is claimed is:

1. A method of communication in a network, comprising:
   receiving a content message in a content space established in the network by a communications circulation device, the content message, having content directed to an area of interest and further not requiring a specified destination address, being transmitted by one of a plurality of terminals coupled to the communication circulation device; and
   transmitting information from the communication circulation device to at least one of the terminals based on the content of the content message.

2. The method of claim 1, further comprising:
   tagging the content message with an identifier;
   propagating the content message in the communication circulation device based on the identifier; and
   generating the information as the content message propagates.

3. The method of claim 2, wherein the tagging step comprises:
   generating the identifier;
   encoding the identifier into a tag; and
   associating the content message with the tag.

4. The method of claim 3, wherein the tagging step is performed in either a control unit of the communication circulation device or a terminal coupled to the control unit.

5. The method of claim 2, wherein the propagating step comprises:
   receiving the content message in a control unit of the communication circulation device;
   retrieving redirection data from a circulation database;
   analyzing the redirection data to determine a next control unit of the communication circulation device to transmit the content message; and
   transmitting the content message to the next control unit.

6. The method of claim 5, wherein the redirection data indicates control units of the communication circulation device that are desirable as the next control unit based on predetermined criteria, the analyzing step determining the next control unit based on a predetermined algorithm and the control units.

7. The method of claim 6, wherein the content message includes a circulation history, the analyzing step further determining the next control unit taking into account control units that have already been traversed.

8. The method of claim 6, wherein the predetermined criteria includes a number of content messages that have passed through a control unit having an identifier that is within a preset number of items in a table of categories of identifiers.

9. The method of claim 2, wherein the generating step comprises:

retrieving message data from a circulation database;

searching the message data for other content messages having identifiers that match the identifier of the content message;

identifying the other content messages that match the content message; and generating destination messages destined to addresses associated with each of the other content messages and the address of the content message as the information.

10. The method of claim 1, wherein the content message comprises:

a tag, the tag corresponding to an area of interest of the content message; and a message.

11. The method of claim 10, wherein the content message further comprises:

a time-to-live value, the time-to-live value indicating the amount of time remaining before the content message dies; and a circulation history that includes identification of control units where the content message has traversed.

12. A communication system operating in a network, comprising:

a communication circulation device establishing a content space and receiving a content message having content directed to an area of interest, the content message not requiring a specified destination address; and a plurality of terminals coupled to the communication circulation device, the communication circulation device transmitting information to at least one of the terminals based on the content of the content message.

13. The system of claim 12, wherein the content message is tagged with an identifier, the communication circulation device propagating the content message based on the identifier and generating the information as the content message is propagated.

14. The system of claim 13, wherein either a control unit of the communication circulation device or one of the terminals tags the content message by generating the identifier, encoding the identifier into a tag, and associating the content message with the tag.

15. The system of claim 12, wherein the communication circulation device receives the content message in a control unit of the communication circulation device, retrieves redirection data from a circulation database, analyzes the redirection data to determine a next control unit of the communication circulation device to transmit the content message, and transmits the content message to the next control unit.

16. The system of claim 15, wherein the redirection data indicates control units of the communication circulation device that are desirable as the next control unit based on predetermined criteria, the analyzing step determining the next control unit based on a predetermined algorithm and the control units.

17. The system of claim 16, wherein the content message includes a circulation history, the analyzing step further determining the next control unit taking into account control units that have already been traversed.

18. The system of claim 16, wherein the predetermined criteria includes a number of content messages that have passed through a control unit having an identifier that is within a preset number of items in a table of categories of identifiers.

19. The system of claim 12, wherein the communication circulation device retrieves message data from a circulation database, searches the message data for other content messages having identifiers that match the identifier of the content message, identifies the other content messages that match the content message and generates destination messages destined to addresses associated with each of the other content messages and the address of the content message as the information.

20. The system of claim 12, wherein the content message comprises:

a tag, the tag corresponding to an area of interest of the content message; and a message.

21. The system of claim 12, wherein the content message further comprises:

a time-to-live value, the time-to-live value indicating the amount of time remaining before the content message dies; and a circulation history that includes identification of control units where the content message has traversed.

22. A method of communication in a network, comprising:

receiving a content message in a content space of the network from a first terminal, the content message having an indication of an area of interest of the first terminal and further not requiring a specified destination address, the content space being a portion of the network established by a communication device wherein similar content messages are matched with each other based on a degree of similarity between compared content messages; and establishing a communication between the first terminal and at least one other terminal when a degree of similarity between the content messages of the terminals exceeds a predetermined threshold.

* * * * *